Figure 1:
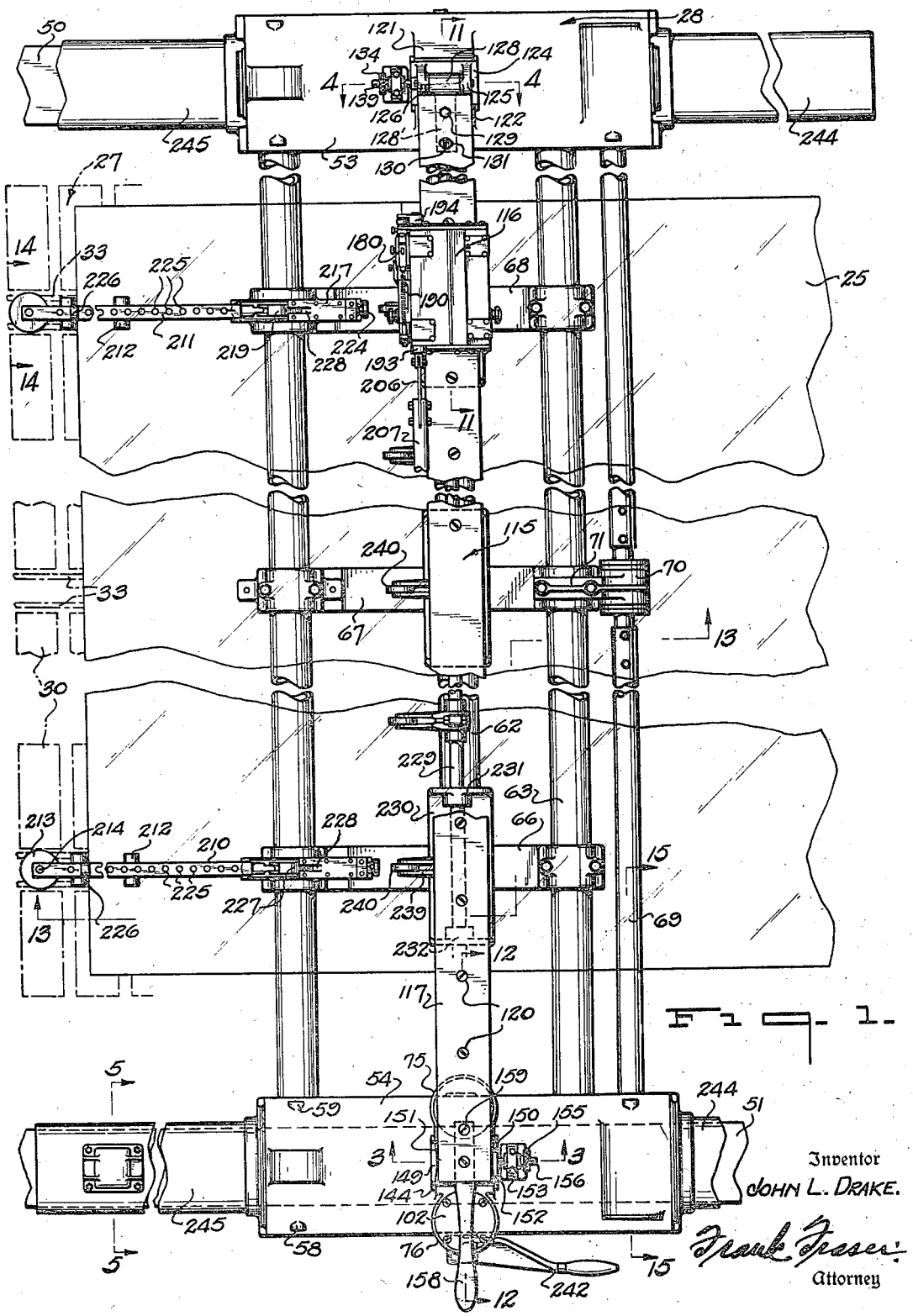

March 10, 1936.  J. L. DRAKE  2,033,188

GLASS CUTTING APPARATUS

Filed April 5, 1933   7 Sheets-Sheet 1

Inventor
John L. Drake.
Frank Fraser
Attorney

March 10, 1936. J. L. DRAKE 2,033,188
GLASS CUTTING APPARATUS
Filed April 5, 1933 7 Sheets-Sheet 3

Inventor
JOHN L. DRAKE.
By Frank Fraser
Attorney

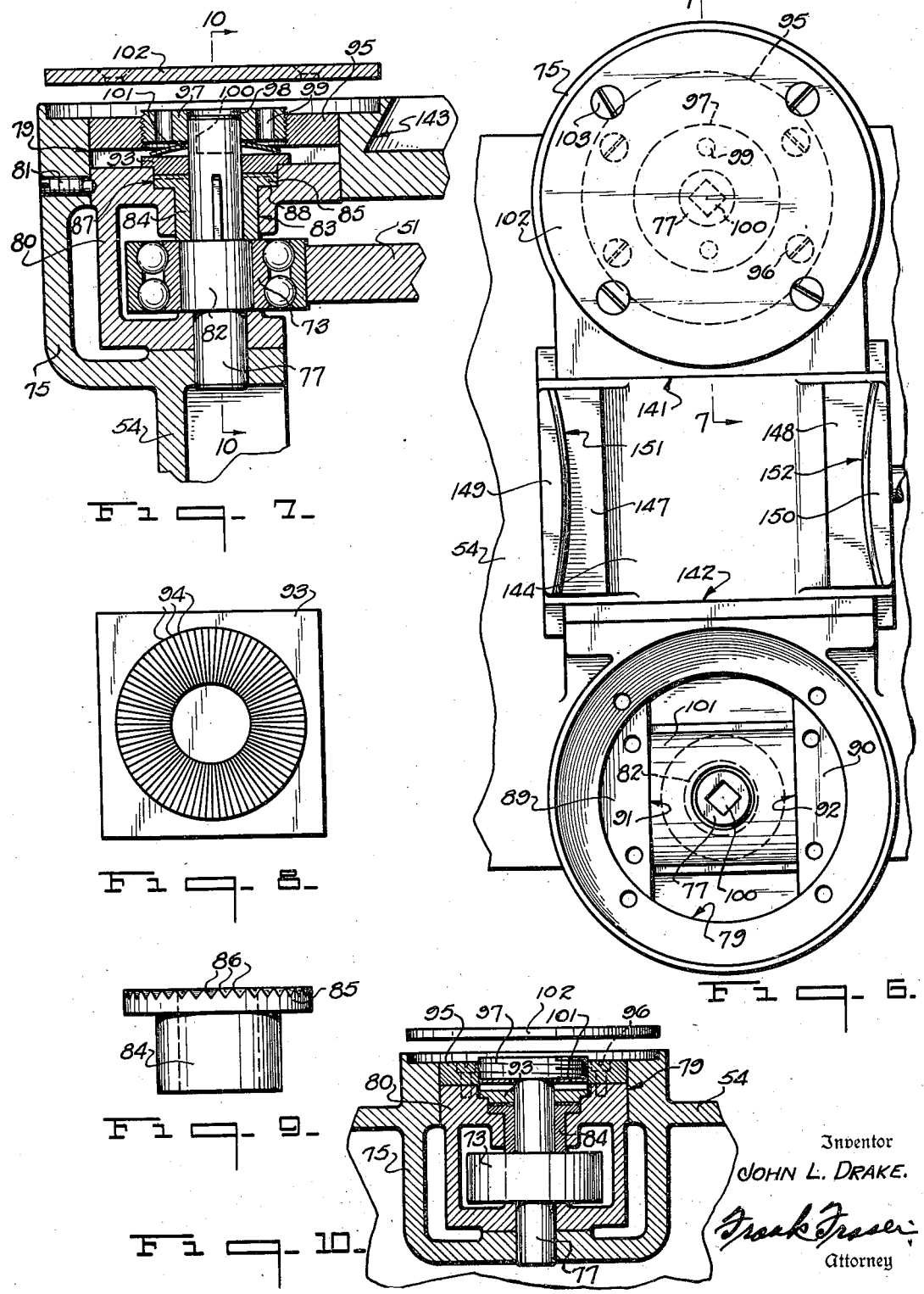

March 10, 1936.  J. L. DRAKE  2,033,188
GLASS CUTTING APPARATUS
Filed April 5, 1933   7 Sheets-Sheet 5

Inventor
JOHN L. DRAKE.

By Frank Fraser
Attorney

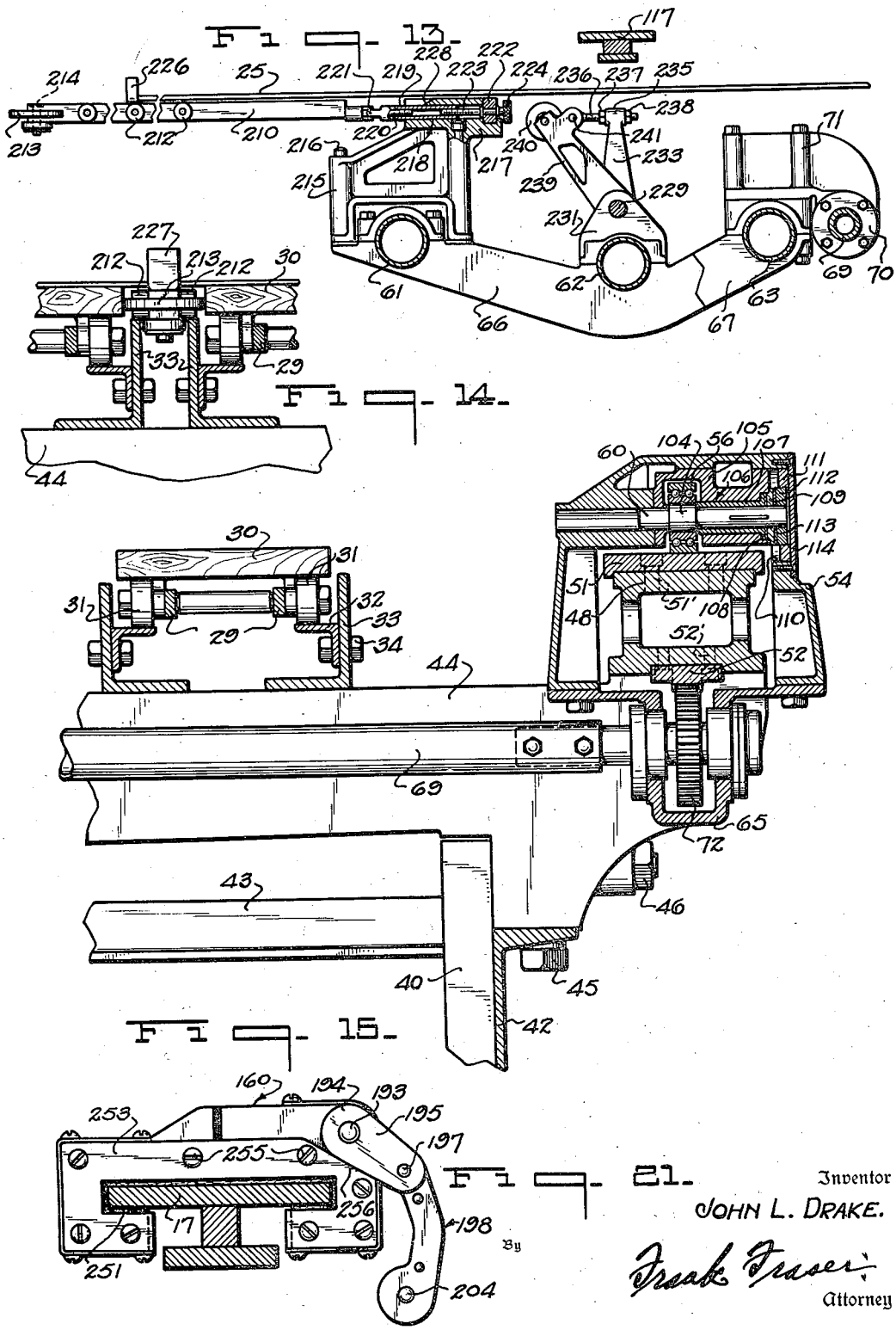

March 10, 1936.  J. L. DRAKE  2,033,188
GLASS CUTTING APPARATUS
Filed April 5, 1933  7 Sheets-Sheet 7
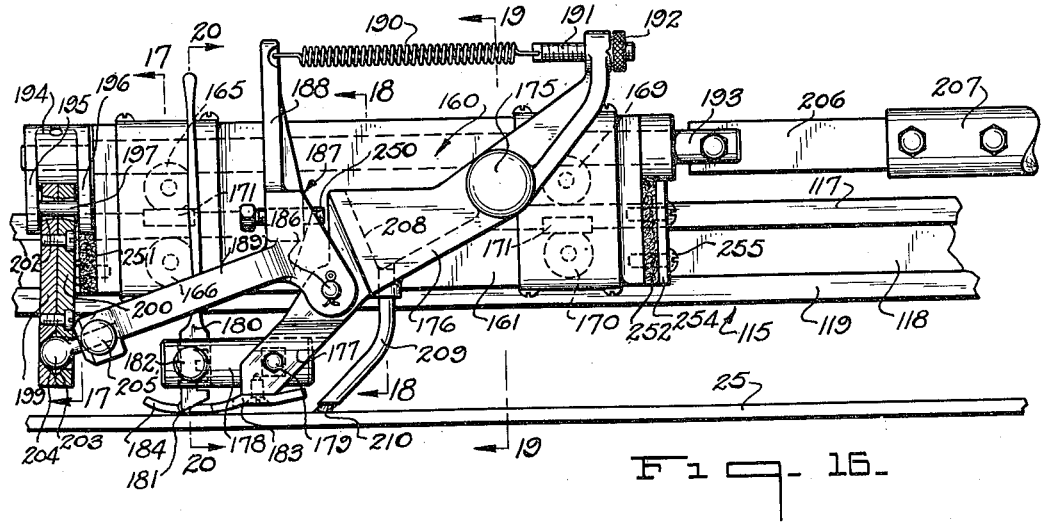
Fig. 16.
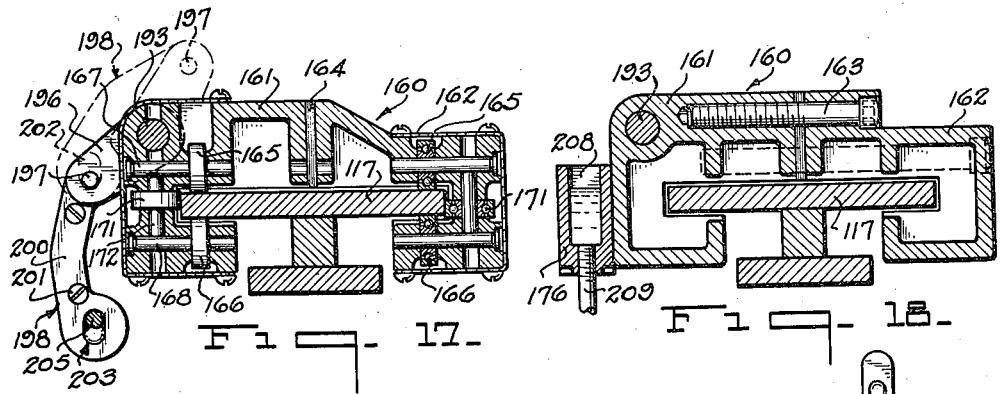
Fig. 17.  Fig. 18.
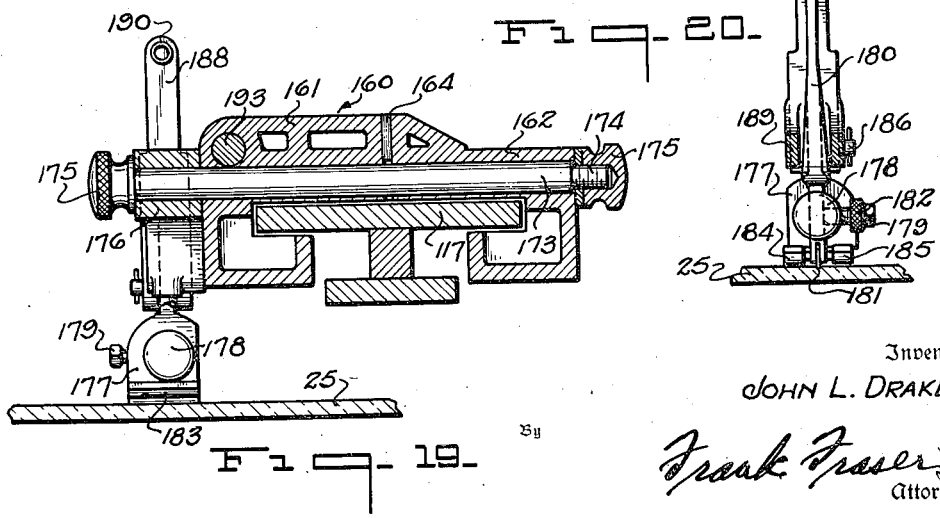
Fig. 20.
Fig. 19.
Inventor
JOHN L. DRAKE.
By Frank Fraser
Attorney Patented Mar. 10, 1936

2,033,188

UNITED STATES PATENT OFFICE 2,033,188

GLASS CUTTING APPARATUS

John L. Drake, Toledo, Ohio, assignor to Libbey-Owens-Ford Glass Company, Toledo, Ohio, a corporation of Ohio Application April 5, 1933, Serial No. 664,589

15 Claims. (Cl. 33—32)

This invention relates broadly to cutting apparatus and more particularly to a machine for cutting or scoring transversely at intervals a continuously formed sheet of glass, although it may of course be employed for the cutting of other sheet material.

In certain systems of producing sheet glass, such as for example in the well known Colburn process, a continuous flat sheet of glass is drawn upwardly from a bath of molten glass and then passed horizontally through an annealing leer. As the continuous sheet or ribbon of glass emerges from the leer, it is received upon a moving table or conveyor better known as the "capping table", and while on this table sections of the desired length are cut off from the advancing end of the sheet, these sections being then carried away to the cutting room where they are divided into the desired sizes.

The primary object of the present invention resides in the provision of a machine or apparatus for accurately scoring the continuous sheet or ribbon of glass along straight transverse lines perpendicular to the travel of the sheet, with the purpose of providing on each cut sheet section two straight parallel edges, thereby saving the cutter two squaring up cuts during the subsequent cutting process and likewise saving the glass previously wasted by reason of these squaring up cuts.

Another important object of the invention is the provision of means for accurately measuring the length of sections cut from the continuous sheet; that is, measuring accurately the distance of the score line from the advancing free end of the ribbon where the last preceding cut was made to the end that the sheet sections will be cut with accurate parallel end edges a fixed distance apart.

A further object of the invention is the provision of a cutting machine or apparatus of the above described character embodying various novel and improved features of construction, arrangement and operation, all of which lend themselves to the cutting or scoring of the continuous sheet or ribbon of glass in a positive, accurate, and efficient manner.

Other objects and advantages of the invention will become more apparent during the course of the following description.

Figure 2:
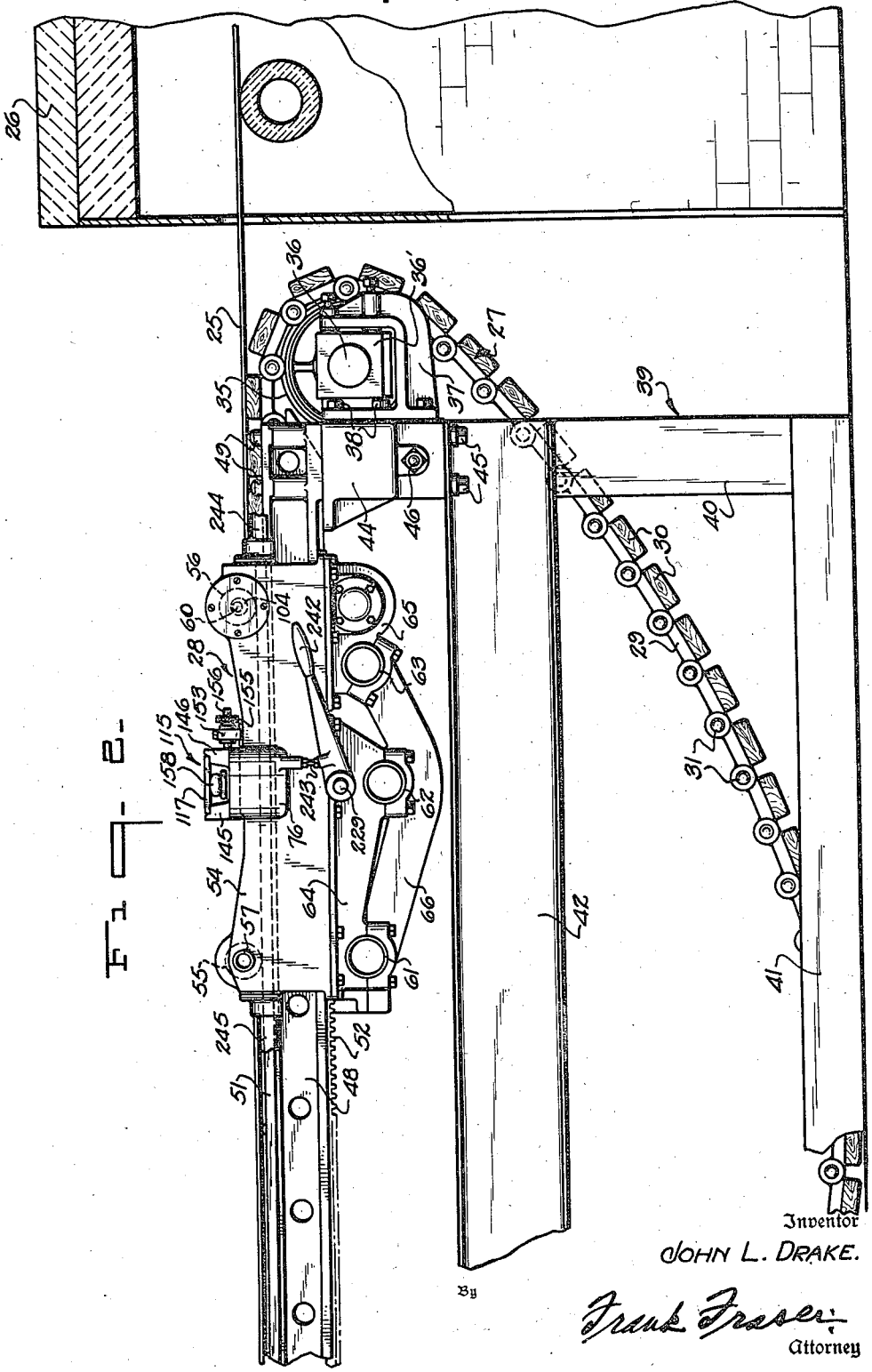
Figure 3:
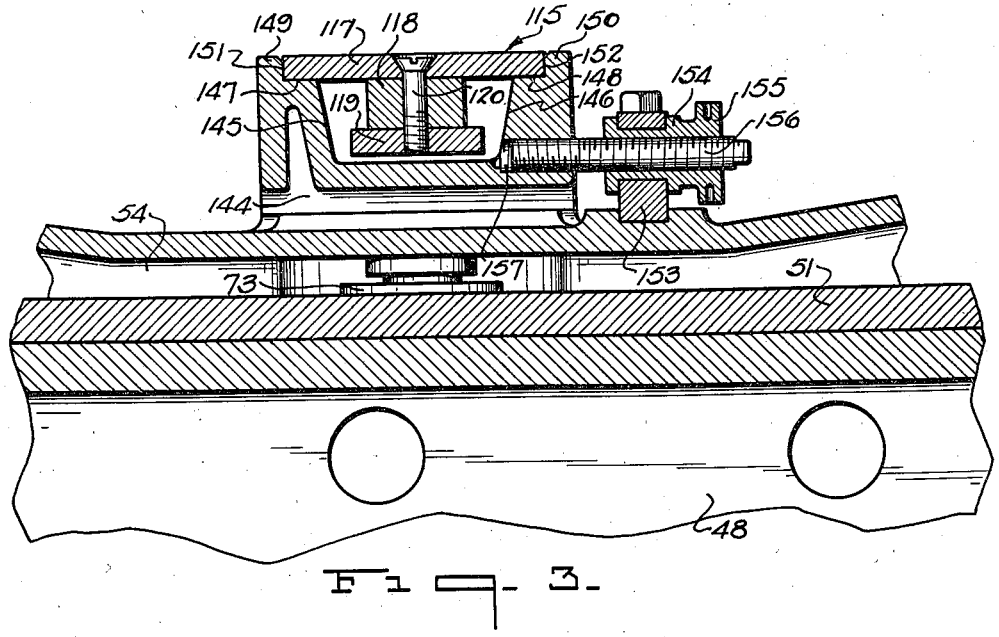
Figure 4:
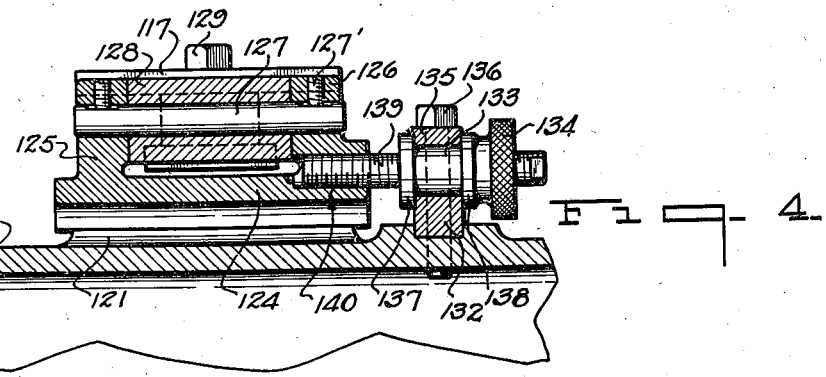
Figure 5:
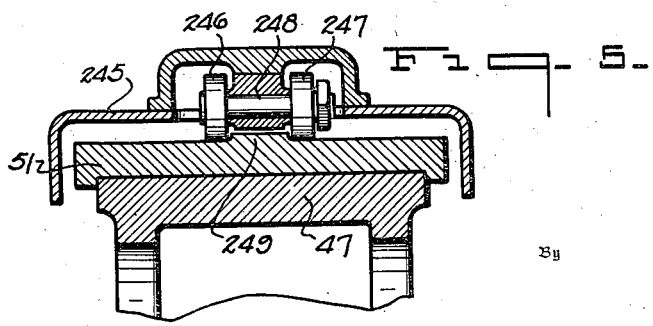
Figure 11:
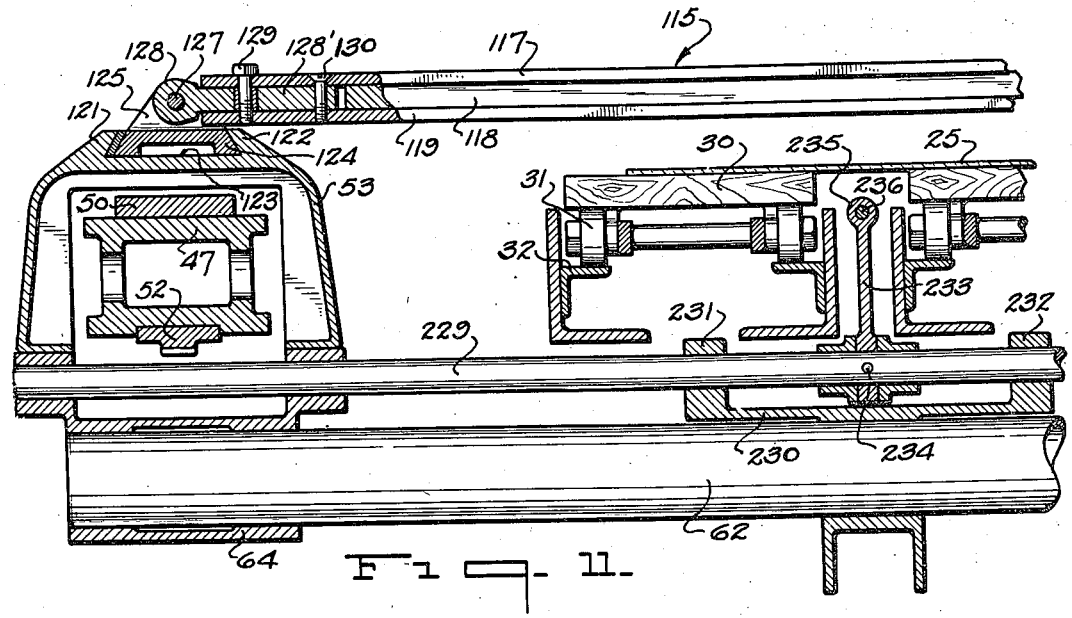
Figure 12:
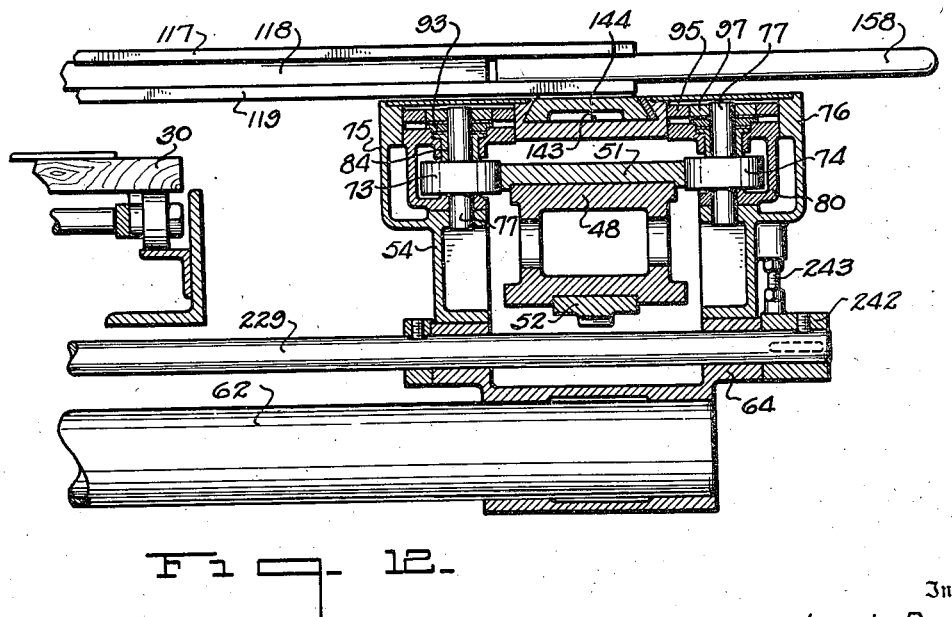

In the drawings wherein like numerals are employed to designate like parts throughout the same, Fig. 1 is a plan view of cutting apparatus constructed in accordance with the present invention, Fig. 2 is a side elevation thereof, Fig. 3 is a detail section taken substantially on line 3—3 of Fig. 1, Fig. 4 is a detail section taken substantially one line 4—4 of Fig. 1, Fig. 5 is a detail section taken substantially on line 5—5 of Fig. 1, Fig. 6 is a plan view of a portion of one of the supporting trucks or carriages, Fig. 7 is a section taken substantially on line 7—7 of Fig. 6, Figs. 8 and 9 are detail views of two different parts of one of the guide wheel assemblies, Fig. 10 is a section taken substantially on line 10—10 of Fig. 7, Fig. 11 is a section taken substantially on line 11—11 of Fig. 1, with the cutter unit removed, Fig. 12 is a section taken substantially on line 12—12 of Fig. 1, Fig. 13 is a section taken substantially on line 13—13 of Fig. 1, Fig. 14 is a section taken substantially on line 14—14 of Fig. 1, Fig. 15 is a section taken substantially on line 15—15 of Fig. 1, Fig. 16 is a front elevation, partially in section, of the cutter unit, Fig. 17 is a sectional view taken substantially on line 17—17 of Fig. 16, Fig. 18 is a sectional view taken substantially on line 18—18 of Fig. 16, Fig. 19 is a sectional view taken substantially on line 19—19 of Fig. 16, Fig. 20 is a sectional view taken substantially on line 20—20 of Fig. 16, and Fig. 21 is an end view of the cutter unit.

Referring now to the drawings and particularly to Fig. 2, the flat continuous sheet of glass 25, emerging from the exit end of annealing leer 26, is received upon a moving supporting table or conveyor 27 commonly termed the cutting or capping table and which travels in the same direction and at the same speed as the glass sheet. Associated with the capping table 27 is the improved cutting mechanism provided by the present invention and designated in its entirety by the numeral 28, said mechanism being utilized in cutting off sections of the desired length from the advancing end of the continuous sheet or ribbon of glass 25, said sections being then carried away to the cutting room where they are divided into the desired smaller sizes.

The general aim of this invention is to provide a cutting mechanism or machine of novel and improved construction with which it is possible to cut the continuous sheet or ribbon of glass, while upon the capping table, into sheet sections with absolute accuracy to the end that sections of a predetermined length, having straight parallel end edges a fixed distance apart may be had, thereby obviating the necessity of squaring up these edges of the glass sections during the subsequent cutting up process; resulting not only in a substantial saving of time and labor, but likewise reducing waste to a minimum.

The capping table 27 may take a variety of different forms, but is here shown (Figs. 1, 2, 11, and 15) as comprising preferably a plurality of spaced parallel pairs of endless chains 29 carrying a series of wooden blocks 30 which form, in the upper run of the said chains, a flat even supporting table for the glass. Each endless chain 29 has a series of rollers 31 which, in their upper run, travel on the horizontal supporting tracks 32 carried by the longitudinally extending angle beams 33; being secured thereto by suitable fastening elements 34. The chains 29 are trained at their ends about relatively large rollers or sprockets 35, one of which is adapted to be positively driven in any desired manner to move the endless table in the same direction as the travel of the glass sheet and at the same speed.

Each sprocket or roller 35 may be mounted upon a shaft 36 extending transversely of the table and journaled at each end within a bearing block 36' carried by a supporting bracket 37 which is in turn secured, by means of bolts or other suitable fastening elements 38, to the supporting structure 39 for the endless table 27. This table supporting structure 39 comprises a substantially rectangular framework including four vertical corner members or legs 40. The legs at the same side of the table may be connected together at their lower ends by a longitudinally extending member 41 and intermediate their upper and lower ends by a channel beam 42. The opposed legs at opposite sides of the table may be suitably tied together as, for instance, by cross members 43 (Fig. 15). Arranged at each end of the supporting framework 39 and extending transversely thereof is a supporting member 44 carried at its opposite ends upon the channel beams 42 and secured thereto by bolts or the like 45, said member 44 being further secured at each end to the respective supporting leg 40 by bolts or the like 46. Carried upon the supporting members 44 are the longitudinally extending angle beams 33 to which the table rails 32 are secured as above described. One or more of the transverse supporting members 44 may also be arranged intermediate the ends of the table, if desired.

Disposed at one side of the capping table 27 is a longitudinally extending beam 47 (Fig. 11), while mounted at the opposite side of the table is a similar longitudinally extending beam 48 (Figs. 1, 12, and 15), each of said beams being supported at its opposite ends upon the cross members 44, being secured thereto by bolts or the like 49 (Fig. 2). Carried upon the top of beam 47 and extending longitudinally thereof is a rail 50, while carried upon the top of beam 48 is a similar longitudinally extending rail 51. However, it will be noted that while rail 50 is relatively narrower than beam 47, rail 51 is somewhat wider than beam 48 for a purpose to be more fully hereinafter apparent. Each rail 50 and 51 is secured to its respective beam by screws or the like 51' (Fig. 15). Carried upon the underside of each beam 47 and 48 is a longitudinally extending rack bar 52, secured in place by screws or the like 52'.

Positioned at opposite sides of the capping table 27 and mounted upon the longitudinally extending beams 47 and 48 are the supporting trucks or carriages 53 and 54 respectively, each of said carriages being of substantially inverted U-shaped formation, as best shown in Fig. 11, and fitting over or straddling the respective beam. Each carriage 53 and 54 is supported by two wheels or rollers 55 and 56 (Fig. 2) positioned adjacent the opposite ends thereof and resting upon and adapted to run along the respective rail 50 or 51. The roller 55 is carried upon a shaft 57 journaled in bearings 58 and 59 (Fig. 1) and is mounted in a relatively fixed position in that it is not adjustable. On the other hand, the roller 56 is carried upon a shaft 60 (Figs. 2 and 15) which is adjustably mounted within the carriage in a manner to be more fully hereinafter described.

The two carriages 53 and 54 at opposite sides of the capping table are tied together in a manner to increase the stiffness and rigidity of the unit by means of the three relatively large parallel tubular members 61, 62, and 63 respectively, the tubular members 61 and 62 being supported at each end in a bracket member 64 suspended beneath the respective carriage, while the tubular member 63 is supported at each end by a bracket 65 also carried upon the underside of the carriage. The tubular members 61, 62, and 63 are connected together intermediate their ends by the three spaced bracing arms 66, 67, and 68 (Fig. 1).

Also extending transversely of the capping table beneath the upper horizontal run thereof is a cross shaft 69 journaled at its opposite ends in the bracket members 65 carried by the carriages 53 and 54 and intermediate its ends in a bearing 70 carried by a bracket 71 secured to the brace arm 67. Fixed to each end of shaft 69, within the respective bracket member 65, is a pinion 72 (Fig. 15) meshing with the corresponding rack bar 52. The function of these two pinions is to insure that both ends of the cutting apparatus move in parallel.

In order to prevent any side play or lateral vibratory movement of the carriages 53 and 54, one of the said carriages, and as here shown carriage 54, is further provided with a pair of guide wheels or rollers 73 and 74 (Fig. 12) which are adapted to engage the opposite side edges of the rail 51, and it is for this reason that the said rail is made relatively wider than beam 48. The rollers 73 and 74 are positioned within the hollow enlarged portions 75 and 76 respectively (Figs. 2, 6, and 12) formed at the opposite sides of carriage 48 intermediate the ends thereof, each guide roller 73 and 74 being mounted upon a vertical shaft 77. Inasmuch as the mounting for each of the guide rollers is exactly the same, a description of only one will be given.

Referring particularly to Figs. 6 to 10 and 12, it will be seen that each enlarged portion 75 and 76 is formed in the top thereof with a circular opening 79 within the lower portion of which is received the upper end of a bearing member 80 secured therein against rotation by a set screw or the like 81. The shaft 77 extends vertically through the member 80 and has formed thereon intermediate its ends an eccentric portion 82 upon which the respective roller 73 or 74 is freely mounted. The bearing member 80 is provided above the guide roller with a circular opening 83 within which is received a bushing 84, said bushing being keyed to the shaft and formed at its upper end with an annular flange 85 provided upon its upper surface with a series of teeth 86 arranged in annular formation. The annular flange 85 on bushing 84 is received within a circular recess 87 formed in bearing member 80 and rests upon the resultant shoulder 88.

The bearing member 80 is further provided upon the top thereof, and at diametrically opposite points with the spaced ribs 89 and 90, the inner faces 91 and 92 thereof being parallel with one another and defining therebetween a substantially rectangular opening within which is received a rectangular plate 93. This plate rests upon the top of the bearing member between the spaced ribs and is formed upon its under surface with a series of teeth 94 arranged to mesh with the teeth 86 on bushing 84. Due to the fact that the opening within which the plate 93 is received is also substantially rectangular, the said plate will be prevented from turning therein.

Also received within the circular opening 79 above bearing member 80 is a disc 95 secured to said bearing member by screws or the like 96 (Fig. 10). The disc 95 is provided with a central internally threaded opening within which is threaded a nut 97, said nut in turn having a plain central opening 98 within which the upper end of the shaft 77 is received. The nut 97 is provided with a plurality of openings 99, within which a suitable instrument, such as a spanner wrench, may be inserted to facilitate rotation thereof. Likewise, the upper end of shaft 77 is formed with a socket 100, within which an instrument may also be inserted, to facilitate turning of said shaft. Encircling the shaft 77 and interposed between plate 93 and nut 97 is a spring plate 101 which is of normally concavo-convex formation as shown in Fig. 7, but which can be flattened out upon threading of the nut 97 inwardly toward the plate 93 as illustrated in Fig. 10. Covering the disc 95 and nut 97 is a cover plate 102 secured in place by screws or the like 103.

As pointed out above, the side rollers 73 and 74 are provided to guide the carriages and to prevent any lateral play thereof. Furthermore, it is possible, with the construction above described, to take up any side play which might result from wear on the rollers or rail. Thus, when it is desired to take up any side play occasioned by one reason or another, it is simply necessary for the operator to first remove cover plate 102 and then thread the nut 97 outwardly so as to permit the spring plate 101 to assume its normal shape and thus release the pressure thereof upon plate 93. The operator can then, by placing an instrument within the socket 100 in the upper end of shaft 77, turn the said shaft slightly and, due to the fact that the guide roller is mounted upon an eccentric portion 82, the said roller can be moved toward and into proper engagement with the rail. It will, of course, be understood that upon turning of the shaft, the bushing 84 will turn therewith so that the teeth 86 thereon will slip beneath teeth 94 on plate 93, which plate remains stationary. After the desired take up has been effected, the operator can again tighten down on nut 97, causing the spring plate 101 to flatten out and force the plate 93 into engagement with bushing 84. Due to the interengagement of teeth 86 and 94, any relative movement between bushing 84 and plate 93 will be prevented and thus the shaft and roller will be locked in adjusted position.

The supporting rollers 56 carried by carriages 53 and 54 are also adjustably mounted in the same manner as are the guide rollers 73 and 74 so that they may be adjusted to always maintain the pinions 72 in proper engagement with the rack bars 52. Since the mounting for the supporting rollers 56 is substantially the same as that of the guide rollers 73 and 74, a detail description thereof is not thought to be necessary. However, by referring particularly to Fig. 15, it will be seen that each supporting roller 56 is loosely mounted upon an eccentric portion 104 formed on shaft 60. Received within the carriage is a bearing member 105 similar to bearing member 80 above described. The bearing member 105 is formed with an opening 106 having received therein a bushing 107 keyed to shaft 60 and provided at its outer end with a flange 108 having a series of teeth which are adapted to mesh with similar teeth formed on a rectangular plate 109 corresponding to plate 93. Secured within an opening 110 in the outer side of the carriage is a disc 111 having a central opening within which is threaded a nut 112, and interposed between the said nut and plate 109 is a spring plate 113. A cover plate 114 is removably secured over the disc 111 and nut 112.

The adjustment of the shaft 60 to move the roller 56 toward the rail is effected in exactly the same manner as described hereinabove in connection with the adjustment of the guide rollers 73 and 74. That is, in order to effect such adjustment, it is simply necessary for the operator, after first removing cover plate 114 and loosening nut 112, to turn shaft 60 in the proper direction whereupon, due to the provision of eccentric portion 104 upon which the roller is mounted, the said roller will be moved toward and into engagement with the rail. The intermeshing teeth on flange 108 of bushing 107 and plate 109 serve to lock the shaft in adjusted position upon tightening of nut 112 to flatten out the spring plate 113. This eccentric take up is provided so that it is possible to adjust the pinion in the event of wear to again obtain the proper mesh between rack and pinion. The mounting of the rail and rack bar upon the top and bottom respectively of a common supporting beam constitutes a very desirable feature of the present invention in that with such a construction, even though deflection or sagging of the beam should occur, the relative positions of the rail and rack will remain the same and proper mesh between the pinion and rack retained.

Extending between and carried by the supporting carriages 53 and 54 is a transverse cutter guide, designated in its entirety by the numeral 115, and upon which the cutter unit, designated in its entirety by the numeral 116, is adapted to be slidably mounted.

The cutter guide 115 comprises a horizontal straight edge 117 to the underside of which is secured a relatively narrower bar 118 and to the underside of this bar is secured a plate 119, said plate being relatively wider than the bar 118 but narrower than the straight edge. The straight edge 117, bar 118, and plate 119 are all secured together by a plurality of screws or other fastening elements 120 (Fig. 1), with the bar terminating short of the opposite ends of the straight edge and plate for a purpose to be more clearly hereinafter apparent. The straight edge is relatively wide and is stiff and true in the direction it is desired to maintain accuracy, while the bar 118 and plate 119 constitute stiffener members in order to reduce the deflection across the sheet.

The cutter guide 115 is adjustably mounted at each end upon the respective carriages 53 and 54 whereby to provide for angular adjustment thereof to square up the transverse cuts with the trimmed side edges of the glass sheet and also to provide for adjustment of the cutter guide longitudinally of and relative to the carriages. To this end, there is formed upon the top of the carriage 53, intermediate the ends thereof, the spaced raised portions 121 and 122 which define therebetween an undercut recess or channel 123 within which is slidably received a substantially rectangular plate 124 provided at its opposite ends with spaced upstanding ears 125 and 126. Extending between and carried by these spaced ears is a pin 127 held against rotation by set screws 127' (Fig. 4).

Pivotally mounted upon pin 127 between ears 125 and 126 is a collar 128 having formed integral therewith an arm 128' which is received between the adjacent ends of the straight edge 117 and plate 119 (Figs. 1 and 11) and connected thereto by the two screws or fastening elements 129 and 130 passing vertically therethrough. The screw 130 operates within a slot 131 arranged transversely of the cutter guide, as best shown in Fig. 1, so that the said cutter guide can be swung laterally upon pivot pin 129 within certain definite limits, depending upon the length of slot 131, to square up the opposite ends thereof.

The plate 124 is slidable longitudinally of carriage 53 within the channel 123, and to effect this adjustment there is carried by the carriage a substantially U-shaped block 132 within which is rotatably mounted an internally threaded sleeve 133 formed at its outer end with a thumb piece 134 to facilitate rotation thereof. The sleeve 133 is maintained within the block 132 by a top plate 135 secured in place by screws or other fastening elements 136 and which screws also serve to secure the block to the carriage. The sleeve 133 is also formed with spaced flanges 137 and 138 disposed at opposite sides of the block 132 and which prevent any longitudinal movement thereof. Threaded through the sleeve is an adjusting screw 139, the inner end thereof being received within an opening 140 in plate 124. From the above, it will be apparent that upon rotation of sleeve 133, the screw 139 will be threaded inwardly or outwardly thereof to effect the desired adjustment of the corresponding end of the cutter guide longitudinally of and relative to the carriage 53.

The opposite end of the cutter guide is also adjustably mounted in substantially the same manner and to this end the enlarged portions 75 and 76 on carriage 54 are so formed that the inner adjacent edges 141 and 142 thereof define therebetween an undercut groove or channel 143 (Fig. 12) within which is slidably mounted a supporting member 144. This supporting member is substantially U-shaped, as best shown in Fig. 3, with the upwardly diverging inner faces of the walls 145 and 146 thereof terminating in horizontal shoulders 147 and 148 respectively upon which the adjacent end of the straight edge 117 is adapted to rest. The bar 118 and plate 119 are received within the space between the side walls 145 and 146.

The side walls of the member 144 extend upwardly above the shoulders 147 and 148 as at 149 and 150 and the inner adjacent faces of these projecting portions are arcuately curved inwardly as indicated at 151 and 152 (Figs. 1 and 6), so that the straight edge 117 has substantially point contact therewith at diametrically opposite points. This permits this end of the cutter guide to pivot and to automatically adjust itself without binding upon bodily adjustment of the opposite end thereof.

The member 144 is adjustable longitudinally of and relative to carriage 54 by substantially the same type of means used for adjusting the plate 124 relative to carriage 53. Thus, upon reference particularly to Figs. 1, 2, and 3, it will be seen that there is secured to the carriage 54 a bearing block 153 carrying a rotatable but non-slidable sleeve 154 having a thumb portion 155 at its outer end. Threaded through the sleeve is a screw 156, the inner end of which is received within an opening 157 in member 144 so that upon rotation of the said sleeve, the screw will be moved inwardly or outwardly with respect thereto to slide the supporting member 144 within the channel or groove 143. When this end of the cutter guide is adjusted in this manner, the opposite end will of course be caused to pivot upon the screw 129.

The side of the endless table 27 at which the carriage 54 is located is ordinarily termed the "capper's side", since it is at this side that the operator, who is called the capper, stands during the cutting operation. Due to the above construction, it is also possible to swing this end of the cutter guide upwardly upon pin 127 in a direction at substantially right angles to the plane of the sheet to permit the removal of the cutter unit 116, to clear any large lumps of glass, etc. Carried at this end of the cutter guide is an operating handle 158 which serves the dual purpose of providing a handle for lifting the straight edge and for moving the carriage unit upon the rails 50 and 51. The inner end of this handle is received between the straight edge 117 and plate 119 and secured thereto by screws or the like 159.

The cutter unit 116 (Figs. 1 and 16 to 21) comprises a cutter carrier or carriage, designated in its entirety by the numeral 160, and being composed of the two parts or sections 161 and 162 secured together by a plurality of transverse screws 163. Positioned between the two sections 161 and 162 is a laminated shim 164, the purpose of which is to provide for adjustment in the original set up and some take up for wear. Carried by each section 161 and 162 of the cutter carriage adjacent one end thereof are the vertically spaced rollers or wheels 165 and 166 mounted upon horizontal pins 167 and 168 respectively and positioned to engage the upper and lower surfaces respectively of the straight edge 117. Also carried by each section, adjacent the opposite end thereof, are similar superimposed rollers 169 and 170, while carried at each end of each section is a horizontal guide roller 171 mounted upon a vertical pin 172 and adapted to engage the respective edge of the straight edge.

Passing transversely through the cutter carriage 160 is a bolt 173 having reduced threaded end portions 174 upon which are threaded nuts 175. Pivotally mounted upon this bolt, forwardly of the cutter carriage, is a rockable cutter arm 176 formed at its lower end with an enlarged head 177 carrying a horizontally disposed cylindrical cutter holder 178 removably secured within the said head by a set screw 179. The cutter holder 178 is formed, adjacent its outer end, with a vertical opening through which is inserted a cutter 180 carrying at its lower end a cutting wheel 181, although a diamond may be substituted for the wheel if desired. The cutter 180 may be of any conventional or preferred type and is secured in place by a set screw 182 passing through holder 178.

Secured to the lower end of the cutter arm 176 is a horizontal guard plate 183 bifurcated to provide the spaced curved guide fingers 184 and 185 respectively which are received at opposite sides of the cutting wheel. The guide fingers 184 and 185 serve to guide the cutting wheel up on the sheet at the beginning of the cutting operation and thereby prevent the same from striking against and chipping or otherwise marring the edge of said sheet or being injured thereby.

Pivotally connected to the cutter arm 176, as at 186, is a bell crank lever 187 comprising a substantially vertical portion 188 and a forwardly and downwardly inclined portion 189. Extending between and connecting the upper ends of the cutter arm 176 and bell crank lever 187 is a tension spring 190, said spring being fastened at one end directly to the vertical portion 188 of the bell crank lever and at its opposite end to a screw 191 passing through the upper end of the cutter arm and having threaded thereupon outwardly of said arm a nut 192. Upon rotation of nut 192, it is possible to regulate the tension of the spring 190 as may be desired. Passing transversely through the vertical portion 188 of bell crank lever 187 and adapted to engage the cutter arm 176 is a screw 250, the purpose of which will be more clearly hereinafter apparent.

Carried by the cutter carriage 160 and extending longitudinally therethrough is a rod 193, projecting beyond the said carriage at the opposite ends thereof. Fixed to the projecting end portion of this rod, adjacent the cutting tool, is a crank lever 194 provided with spaced ears 195 and 196 carrying therebetween a pin 197 upon which is pivotally mounted a link member 198. This link member consists of a pair of similarly shaped plates 199 and 200 secured together by a plurality of screws or the like 201. The opening 202 in the link member and through which pin 197 is received is so shaped that the said link member is permitted a limited amount of lateral rocking movement. As a matter of fact, the opening 202 is shaped so that there is substantially line contact between the link member and pin thereby allowing free working movement of the former relative to the latter. The link member is also formed adjacent the lower end thereof with a socket 203 within which is received a ball head 204 carried at the end of a shank 205, said shank being received within the adjacent end of the forwardly and downwardly inclined portion 189 of bell crank lever 187; being secured therein by a set screw or the like 205'. The portion 189 of bell crank lever 187 may be provided with a vertical opening or slot through which the cutter 180 is received.

Connected to the opposite end of the rod 193, by means of a flat leaf spring 206, is the operating rod or handle 207, said handle extending transversely of the capping table 27 and adapted to be grasped by the operator when it is desired to slide the cutter unit along the straight edge.

Suitable wiping members 251 and 252 of felt or the like may be provided at opposite ends of the cutter carriage 160 to wipe the straight edge 117 and keep it clean. These wiping members may be secured in place by plates 253 and 254 respectively through which pass fastening elements 255. The plate 253 is, as best illustrated in Fig. 21, cut away at one corner as at 256, to constitute a positive stop against which the crank lever 194 is adapted to abut when the cutting tool is moved into cutting position.

When operating the scoring tool, the operator grasps the outer end of handle 207 and pushes the cutter unit backward and forward along the straight edge. Whenever it is desired to make a score line across the glass sheet the operator simply turns the handle 207 to the left which will force the cutting tool, through the linkage illustrated, down into cutting position. More specifically, upon rotation of the handle in this direction the link 198 will be urged downwardly to rock the bell crank lever 187 about its pivot 186, thereby moving the vertical portion 188 thereof to the left in Fig. 16. This will cause the bolt 250 to be moved out of engagement with the cutter arm 176, thereby placing the spring 190 under tension and resulting in the cutter arm 176 being rocked upon bolt 173 to lower the cutting wheel 181 onto the surface of the glass sheet. The handle 207 is turned by the operator until the crank lever 194 abuts the positive stop 256, at which time the tension spring is extended to put on the cutter any pressure required. While holding the crank lever 194 firmly against the stop 256, the operator slides the cutter unit along the straight edge with the cutting tool in contact with the sheet to score the same. Thus, the maintaining of a desired and uniform pressure of the cutting tool upon the glass is not dependent upon the skill of the operator but upon the tension of spring 190, which can be varied at will by adjustment of the nut 192. The cutting tool is in this way yieldably held in engagement with the glass sheet so that it is capable of a limited amount of vertical movement to take care of any irregularities or waves in the glass.

The flat leaf spring 206 provides a flexible connection allowing the handle 207 to be held in any position by the operator and takes up any play between the supporting rollers 165, 166, 169 and 170 and straight edge. The cutter arm 176 moves in a plane parallel to the straight edge so that any inequalities in the surface of the glass or deflection in the straight edge will not affect the location of the cut. After the cut or score has been made, the operator rotates the handle 207 in the opposite direction to effect raising of the link member 198, thereby rocking the bell crank lever 187 in the opposite direction about its pivot to again bring the bolt 250 into engagement with the cutter arm. Upon continued upward movement of the link member, the cutter arm 176 will be rocked about its pivot to raise the cutting tool up off of the glass. During the time the cutting tool is maintained in its elevated or non-cutting position, the crank lever 195 and link member 198 assume the positions indicated by the broken lines in Fig. 17.

In order to facilitate the scoring of the glass by the cutting wheel, provision is made for applying a line of oil upon the sheet in advance of the cutter. To this end, the cutter arm 176 is made with a recess 208 constituting a receptacle which is adapted to contain a quantity of oil. This oil is conducted from the receptacle through a tube 209 within the lower end of which is inserted a wick 210, said wick being adapted to ride along upon the glass directly in advance of the cutting wheel so as to apply a thin film of oil thereto.

It is of course obvious that since the glass sheet 25 and capping table 27 are continuously moving, it is necessary that the cutting apparatus also move with the table and sheet while the scoring operation is being performed. This invention, therefore, contemplates the provision of means whereby the carriages 53 and 54 and cutter guide 115 will be caused to move with the sheet during the scoring operation, whereby each score line will be exactly at right angles to the direction of travel of the sheet and parallel with the preceding score line. In addition, such means also embodies means for accurately measuring the distance from the free end of the sheet to the new score line.

To effect this movement of the cutting mechanism with the sheet, there are provided, as shown in Fig. 1, two spaced longitudinally extending measuring rods or draw bars 210 and 211 which are somewhat longer than the greatest length of sheet to be cut with this apparatus, said draw bars being mounted below the path of travel of the sheet in the spaces between two adjacent rows of supporting blocks 30 carried by the chains 29. Each draw bar 210 and 211 is provided with a series of horizontal rollers 212 which ride along the upper edges of the angle members 33 (Figs. 1 and 14) which support rails 32. Carried at the forward end of each draw bar is a relatively large disc 213 mounted upon a vertical pin 214, said disc being of a diameter substantially equal to the space between the adjacent rows of wooden blocks 30 so as to maintain the said draw bar straight and prevent any lateral play thereof.

Upon reference particularly to Figs. 1 and 13, it will be seen that the inner end of each draw bar 210 and 211 is associated with a supporting bracket 215 fitting over the tubular cross member 61 and being secured to the respective bracing arm 66 or 68 by suitable fastening elements 216. The upper end of each bracket 215 is formed with a bearing portion 217 having a horizontal bore 218 extending therethrough and within which is received a sleeve 219. Threaded within the forward end of this sleeve is a screw 220 connected to the inner end of the respective draw bar 210 or 211 by a universal connection 221. The bearing portion 217 carries at its inner end a block 222 through which operates a rotatable but non-slidable screw 223 having at its outer end a thumb portion 224 to facilitate rotation thereof while the inner end of the screw is threadedly received within the adjacent end of sleeve 219. From the above, it will be apparent that upon rotation of the screw 223, the sleeve 219 will be threaded inwardly or outwardly with respect to the bracket 215 to vary the length of the draw bar.

Each draw bar 210 and 211 is provided with a series of openings 225 adapted to receive therein a block or the like 226 engageable by the free end of the advancing sheet of glass 25. The openings 225 may be spaced from one another any suitable distance but are, for example, preferably one inch apart. The sleeve 219 carries upon the top thereof a series of graduations 227 (Fig. 1) which cooperate with the edge 228 of the bearing portion 217, said edge serving in the nature of a pointer. It is therefore possible to adjust the length of the draw bars 210 and 211 independently of one another so that the blocks 226 carried thereby will be accurately positioned opposite one another. The two draw bars act to square up the front end of the sheet and in addition take care of broken sheets.

Extending transversely beneath the upper run of the capping table 27 and preferably positioned directly beneath the cutter guide 115 is a cross shaft 229 supported at its opposite ends by the bracket members 64 carried by carriages 53 and 54 and also intermediate its ends by a plurality of spaced brackets 230 (Figs. 1 and 11) carried by the tubular cross member 62, said brackets being provided with upstanding end portions 231 and 232 through which the said shaft 229 is received. Mounted upon shaft 229 at a plurality of spaced points throughout its length or, in other words, between the adjacent rows of wooden blocks 30, are the vertical arms 233 keyed to the shaft as indicated at 234 in Fig. 11 and each being provided at its upper end with a bearing portion 235 through which is inserted a screw 236 having threaded thereupon at opposite ends of the bearing portion 235 the nuts 237 and 238.

Also carried by shaft 229 are a plurality of levers 239, one for each stationary arm 233, said levers being loosely mounted upon the shaft and carrying at their upper ends freely rotatable breaker rolls 240. The outer end of each screw 236 is pivoted to the respective lever 239 as at 241. The cross shaft 229 projects at one end beyond the carriage 54 and is provided at its outer end with an operating handle 242 which is adapted to be grasped by the operator when it is desired to break the sheet along the score line. Thus, after the score has been made across the glass sheet, the operator will depress the handle 242 thereby rocking the shaft 229 in a clockwise direction and simultaneously lifting all of the rolls 240 against the lower surface of the sheet and elevating the said sheet adjacent the score line until it breaks along this line.

With the construction above described, it is possible to adjust the levers 239 relative to and independently of one another so that all of the rolls 240 can be brought to and maintained in a position to simultaneously engage the under surface of the sheet upon rocking of shaft 229. This adjustment can be effected by merely moving the screw 236 in the desired direction to lift or lower the respective lever 239 and roll 240. A stop bolt 243 carried by carriage 54 is engageable by the handle 242 to limit the upward movement thereof and, as a consequence, the downward movement of the breaker rolls 240.

For the purpose of protecting the rails 50 and 51 from broken glass, etc., there may be carried at the opposite ends of each supporting carriage 53 and 54 the guard members or aprons 244 and 245 respectively which extend longitudinally of and are arranged over the corresponding rail. The guard members 244 extend rearwardly from the carriages while the guard members 245 extend forwardly thereof. The guard members 245 are ordinarily relatively longer than guards 244 and may each be supported adjacent its forward end by a pair of rollers 246 and 247 (Fig. 5) carried at the opposite ends of a horizontal pin 248. Beyond the limit of forward movement of the cutting mechanism, each rail 50 and 51 may be provided with a centrally disposed rib 249 positioned between the rollers 246 and 247, said rib serving to guide the rollers and prevent twisting of the guard member. Due to the fact that the guard members 244 are relatively short, it is not ordinarily necessary to provide any additional means for supporting the same, but such means could of course be used if desired.

Although it is believed that the operation of the improved cutting mechanism herein provided will be fully understood from the above description taken in connection with the drawings, yet it may be well to point out briefly that when it is desired to score the moving sheet or ribbon of glass 25 transversely as it is being carried forwardly upon the capping table, the draw bars 210 and 211 are first properly adjusted so that their positions correspond to one another. The operator then places the blocks 226 within the desired openings 225 in the draw bars, depending upon the length of sheet section to be cut. When the advancing free end of the glass sheet encounters the blocks 226, the cutting mechanism will be caused to move with the sheet. As soon as the operator observes that the cutting mechanism is moving with the sheet, he will grasp the operating handle 207 and draw the cutter unit across the sheet as heretofore described, with the scoring tool in contact therewith. After the glass has been scored, the operator depresses handle 242, causing the raising of the breaker rolls 240 to break the sheet along the score line. After the sheet has been thus scored and broken, the blocks 226 are removed so that the cut sheet section will be carried onwardly by the table while the operator, by grasping handle 158, can move the cutting mechanism rearwardly upon the rails 50 and 51 to its starting position whereupon the above cycle of operations can be repeated.

The accuracy of the measuring bars 210 and 211 may be adjusted at any time by simply rotating the screws 223 in the desired direction. The cutter guide 115 may also be adjusted bodily longitudinally of and relative to the supporting carriages 53 and 54 in the event it is more desirable to obtain the adjustment for length in this way rather than to use that provided on the measuring bars.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, and means for adjusting one end of said guide member bodily in the direction of travel of the sheet and relative to the respective carriage.

2. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, and means for adjusting the opposite ends of said guide member bodily independently of one another in the direction of travel of the sheet and relative to the respective carriages.

3. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, means for adjusting one end of said guide member bodily in the direction of travel of the sheet and relative to the respective carriage, and means for pivotally mounting the opposite end of said guide member so that the said guide member may be swung about said pivot in the plane of the sheet upon bodily adjustment of said first mentioned end.

4. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, means for adjusting the opposite ends of said guide member bodily independently of one another in the direction of travel of the sheet and relative to the respective carriages, and means for pivotally mounting the opposite ends of said guide member so that upon bodily adjustment of one end thereof, the said member may be caused to swing in the plane of the sheet about its pivot at the opposite end.

5. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, and means for pivotally mounting the guide members at one end thereof so that the said member may be swung upwardly in a direction at substantially right angles to the plane of the sheet.

6. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, and means for pivotally mounting the guide member at one end thereof so that the said member may be swung in two directions at substantially right angles with respect to one another.

7. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, means for pivotally mounting the guide member at one end thereof so that the said member may be swung upwardly in a direction at substantially right angles to the plane of the sheet, and means for also pivotally mounting the guide member so that it may be swung in the plane of the sheet.

8. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, means for adjusting the opposite ends of said guide member independently of one another in the direction of travel of the sheet and relative to the respective carriages, and means for pivotally mounting the guide member at one end so that the said member may be swung upwardly in a direction at substantially right angles to the plane of the sheet.

9. An apparatus for transversely scoring a moving sheet of glass, including opposed carriages positioned at opposite sides of the path of travel of the sheet and movable parallel with the movement thereof, a guide member for a scoring tool extending transversely of said sheet and carried at its opposite ends by said carriages, means for adjusting the opposite ends of said guide member bodily independently of one another in the direction of travel of the sheet and relative to the respective carriages, means for pivotally mounting the opposite ends of said guide member, so that upon bodily adjustment of one end thereof, the said member may be caused to swing in the plane of the sheet about its pivot at the opposite end, and means for also pivotally mounting the guide member at one end thereof so that the said member may be swung upwardly in a direction at substantially right angles to the plane of the sheet.

10. An apparatus for transversely scoring a moving sheet of glass, including a pair of horizontal parallel rails extending longitudinally at opposite sides of the path of travel of the sheet, a carriage associated with each rail, supporting rollers carried by each carriage and running along upon the top of the respective rail, a rack bar positioned beneath each rail and extending longitudinally thereof, pinions meshing with said rack bars, means for connecting the opposed pinions together, an eccentric mounting for one of the rollers supporting each carriage for taking up wear and maintaining the pinion in proper mesh with the respective rack bar, and a guide member for a scoring tool extending transversely of the sheet and carried at its opposite ends by said carriages.

11. An apparatus for transversely scoring a moving sheet of glass, including a pair of horizontal parallel rails extending longitudinally at opposite sides of the path of travel of the sheet, a carriage associated with each rail, supporting rollers carried by each carriage and running along upon the top of the respective rail, a guide member for a scoring tool extending transversely of the sheet and carried at its opposite ends by said carriages, guide rollers carried by one of the carriages and engaging the opposite side edges of the respective rail, and an eccentric mounting for each guide roller whereby the said roller may be moved toward the rail to take up wear.

12. An apparatus for transversely scoring a moving sheet of glass, including a pair of horizontal parallel rails extending longitudinally at opposite sides of the path of travel of the sheet, a carriage associated with each rail, supporting rollers carried by each carriage and running along upon the top of the respective rail, a rack bar positioned beneath each rail and extending longitudinally thereof, pinions meshing with said rack bars, means for connecting the opposed pinions together, an eccentric mounting for one of the rollers supporting each carriage for taking up wear and maintaining the pinion in proper mesh with the respective rack bar, a guide member for a scoring tool extending transversely of the sheet and carried at its opposite ends by said carriages, guide rollers carried by one of the carriages and engaging the opposite side edges of the respective rail, and an eccentric mounting for each guide roller whereby the said roller may be moved toward the rail to take up wear.

13. An apparatus for transversely scoring a moving sheet of glass, including a pair of horizontal parallel rails extending longitudinally at opposite sides of the path of travel of the sheet, a carriage associated with each rail, supporting rollers carried by each carriage and running along upon the top of the respective rail, a guide member for a scoring tool extending transversely of the sheet and carried at its opposite ends by said carriages, a plurality of cross members extending between and connecting the carriages beneath the sheet, means for connecting the cross members together intermediate their ends, a rockable shaft also extending transversely beneath the sheet and supported by one of said cross members, a handle arranged at one end of said shaft for rocking the same, a plurality of sheet breaking rollers carried by the shaft, and an individual mounting for each roller so that the said rollers may be adjusted independently of one another circumferentially of the shaft.

14. An apparatus for transversely scoring a moving sheet of glass, comprising a carriage movable parallel with the movement of the sheet and including a guide bar extending transversely above said sheet, a cutter carriage slidably mounted upon the guide bar, a cutter arm pivotally carried by the cutter carriage and movable in a plane parallel to that of the guide bar, a cutting tool carried by said cutter arm, a bell crank lever pivoted to said cutter arm and including a substantially vertical portion and a forwardly and downwardly inclined portion, a tension spring connecting the substantially vertical portion of the bell crank lever and the upper end of the cutter arm, a rotatable member carried by the cutter carriage, an operating handle flexibly connected to one end of the member, and connections between the opposite end of said member and the forwardly and downwardly inclined portion of the bell crank lever so that upon rotation of the said member the cutter arm will be rocked about its pivot to raise or lower the cutting tool.

15. An apparatus for transversely scoring a moving sheet of glass comprising a carriage movable parallel with the movement of the sheet and including a guide bar extending transversely above said sheet, a cutter carriage slidably mounted upon the guide bar, a cutter arm pivotally carried by the cutter carriage and movable in a plane parallel to that of the guide bar, a cutting tool carried by said cutter arm, a lever pivoted to said cutter arm and including a substantially vertical portion and a substantially horizontal portion, a tension spring connecting the substantially vertical portion of the lever and the upper end of the cutter arm, a rotatable member carried by the cutter carriage, an operating handle connected to one end of the member, and connections between the said member and the substantially horizontal portion of said lever so that upon rotation of the said member the cutter arm will be rocked about its pivot to raise or lower the cutting tool.

JOHN L. DRAKE.